United States Patent
Shen et al.

(12)

(10) Patent No.: US 6,195,229 B1
(45) Date of Patent: Feb. 27, 2001

(54) THIN FILM MR HEAD AND METHOD OF MAKING WHEREIN POLE TRIM TAKES PLACE AT THE WAFER LEVEL

(75) Inventors: Yong Shen, Milpitas; Bertha Higa-Baral, San Jose; Lien-Chang Wang, Fremont, all of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/385,844

(22) Filed: Aug. 30, 1999

Related U.S. Application Data (62) Division of application No. 09/015,970, filed on Jan. 30, 1998, now Pat. No. 5,996,213.

(51) Int. Cl.⁷ .............................. G11B 5/33; G11B 5/127; H01L 43/00
(52) U.S. Cl. ..................... 360/113; 360/119; 360/121; 257/422; 29/603.15; 216/22
(58) Field of Search ..................... 216/22, 40, 66, 216/79; 29/603.1, 603.13, 603.15, 603.16, 603.18; 257/421–427; 360/113, 119, 121, 317

(56) References Cited

U.S. PATENT DOCUMENTS 5,438,747 * 8/1995 Krounbi et al. ................. 29/603
5,640,753 * 6/1997 Schultz et al. ................. 29/603.08
5,878,481 * 3/1999 Feng et al. ................. 29/603.15
5,996,213 * 12/1999 Shen et al. ................. 29/603.15

\* cited by examiner

*Primary Examiner*—Gregory Mills
*Assistant Examiner*—Alva C Powell
(74) *Attorney, Agent, or Firm*—Nathan N. Kallman (57) ABSTRACT

A method of manufacturing a thin film merged magnetic head including an inductive write structure and a magnetoresistive sensor uses a patterned protection layer to protect a second shield/bottom pole layer in regions spaced from the pole tip of the inductive write structure. A window is provided in the protection layer. During manufacture, the configuration comprises a first shield layer, a magnetoresistive element, a second shield layer serving as a bottom pole, a protection layer, a protection window, a write gap, a top pole, and a pole tip structure. The use of a protection layer and window results in the formation of channels in the second shield layer adjacent to a pedestal that supports the inductive write structure. The channels prevent magnetic flux from extending toward the second shield layer beyond the width of the pole tip structure. This structure reduces side writing with a consequent improvement in off-track performance. The width of the second shield layer allows the magnetoresistive element to be shielded.

6 Claims, 8 Drawing Sheets

FIG. 7c

THIN FILM MR HEAD AND METHOD OF MAKING WHEREIN POLE TRIM TAKES PLACE AT THE WAFER LEVEL

This is a division of application Ser. No. 09/015,970 filed Jan. 30, 1998 now U.S. Pat. No. 5,996,213.

FIELD OF THE INVENTION

This invention relates to a merged thin film magnetic head incorporating an inductive head for writing data and a magnetoresistive (MR) sensor to read recorded data and in particular to a method of trimming to align the top and bottom poles at write gap of the write inductive head at wafer level with minimized impact on read sensor performance.

DESCRIPTION OF THE PRIOR ART

Personal computers store data on hard disk drives which consist of one or more magnetic disks that store data. Data are written to and read from the disks by read/write heads, one on each side of a single disk. These read/write heads determine the density of data that can be stored on a given size disk. The heads are more difficult and costly to manufacture than the disks, involving a variety of rigorous thin film deposition and patterning steps. The trend in the computer industry is toward higher densities with an increasing number of bits per square inch. Concurrently with this trend is the trend toward a high data rate.

In a disk drive, bits are stored magnetically, with a binary one or zero being determined by the direction of a magnetic field recorded on the surface of the disk. The read/write head writes data to the disk by switching the magnetic field in a given area, and it reads the data by sensing the direction of the recorded magnetic field. Conventional read/write heads perform both the write function and the read function with a single inductive head. An electrically conductive coil is used to induce a magnetic field at a transducing gap to write information on a magnetic disk. The same coil is used during the read mode to sense the magnetic field recorded on the disk.

A problem with inductive heads is that a large number of coil turns is required to sense read signals. The high coil turns increase head response time and therefore significantly reduce the data rate. As the area in which a bit is stored gets narrower, necessitated by the desired higher write densities and smaller disk sizes, the read pulse signals are narrower, and experience undesirable noise and therefore are more difficult to process.

Presently, magnetoresistive (MR) sensor elements are used to read recorded magnetic signals. The MR sensor measures changes in resistance when a magnetic field is applied to change the magnetization of the MR element. The MR element may operate using either the anisotropic MR (AMR) effect, the spin-valve (SV) effect or the giant magnetoresistive (GMR) effect. By measuring the resistance change, MR heads can be used for reading data, but the writing of data must still be performed with inductive heads. Therefore, a "merged" head design is employed wherein read/write heads have both an inductive write head and an MR read head.

In the structure of a merged AMR head, the AMR element consists of three layers, an MR sensor layer composed of Permalloy (NiFe), a tantalum spacer layer and a NiFe alloy soft adjacent layer (SAL). The SAL has a higher resistance than the low resistance MR sensor layer and provides an external bias which improves the linearity of the response. The MR sensor is coupled to external read circuits by interconnect leads, for example a tri-layer sandwich of Ta/Au/Ta, and the distance across the active MR sensing region defines the read track width.

NiFe shields are provided around the MR element to prevent stray magnetic flux and flux from adjacent tracks from affecting the MR sensor. Between shields, the flux is guided to the MR sensor. The shields are separated from the MR element and the interconnects by a dielectric thin film, such as aluminum oxide, 300–2000 Angstroms thick depending on linear recording density.

A write head consisting of copper coils, a write gap and a magnetic yoke structure is fabricated on top of the read head. The second shield of the MR element also functions as the bottom pole (P1) of the write head.

Specifically, thin film transducers are fabricated with a bottom pole layer P1 and a top pole layer P2, made of Permalloy or other high moment soft magnetic materials. The pole layers are connected at a back closure to complete a magnetic flux path. Opposite the back closure, a nonmagnetic transducing gap is formed at pole tips which are extensions of the bottom pole layer P1 and top pole layer P2. An electrical coil of one or more layers separated by insulation is fabricated between the two pole layers. Changes in electrical current supplied to the coil cause magnetic flux changes in the magnetic yoke (P1/P2) at the transducing gap which cause magnetization change representing data bits to be registered on an adjacent moving magnetic disk. Conversely, flux changes representing data bits on an adjacent magnetic disk may be read by the MR element and processed by read circuitry.

Inductive write head performance is determined in part by the precision of the alignment between the top pole tip (P1) and the bottom pole tip (P2). This alignment defines the characteristics of the fringe field at the transducing gap, such as magnetic field strength and gradient. It is important that the pole tips have the same width so that flux leakage is minimized. The alignment of pole tips has in the past been attempted by a pole trimming process during fabrication of the inductive thin film head.

U.S. Pat. No. 5,578,342 describes a process for producing a conventional thin film magnetic head which uses the top magnetic pole as a self-aligning mask for partially trimming the bottom magnetic pole. The yoke and pole tip regions to be trimmed are processed by separate and distinct photolithographic steps, attempting to achieve noncritical alignment in the yoke area, while maintaining critical alignment in the pole tip region which includes the transducing gap.

The bottom pole P1 is first deposited on a substrate, P1 being wider than is desired in the final product. Next an insulating layer is deposited over P1 which forms the transducing gap. After deposition of a coil assembly surrounded by insulation, a top pole P2 is deposited over an insulating layer. The nonaligned pole tip structure is aligned by using a material removal process such as ion milling. Ion milling is a process in which a surface is bombarded by high energy ions to remove the nonaligned portions of the pole tip. A protective photoresist mask shields the top pole and a portion of the insulating layer at the transducing gap. The result desired is an aligned pole tip structure. In practice, however, the self-masking of the top pole P1 during ion milling limits the accuracy of the final pole tip structure. Attempts at more precise masking have improved the process but it still falls short, especially as head designs have become smaller.

As described previously, a merged MR structure combines a magnetoresistive (MR) read head and a separate write head. The MR layer is sandwiched between a bottom shield layer S1 and a top shield layer S2. In this structure, the top shield layer S2 of the MR head is used as the bottom pole P1 of the write head. A problem with present MR heads of this type is that the write head generates significant side-fringe fields during writing, caused by flux leakage from the top pole P2 to parts of the bottom pole P1 that extend beyond the desired alignment. Side fringing fields limit track density by limiting the minimum track width possible. When a track written by such a write head is read by the MR element of the read head, off-track performance is poor because of interference with adjacent tracks.

In U.S. Pat. No. 5,438,747 a merged MR head is provided which has vertically aligned side walls to minimize side-fringing and improve off-track performance. The bottom pole piece P1, which comprises the second shield layer S2 of the read head, has a pedestal pole tip with a short length dimension. A pedestal pole tip with a length as short as two times the length of the gap layer G optimally minimizes the side writing and improves off-track performance. The bottom pole tip structure of the write head is constructed by ion beam milling using the top pole tip structure as a mask. The ion beam milling is directed at an angle to the side walls of the top pole tip structure which causes the bottom pole tip structure to be milled with side walls which align with the top pole tip structure. The ion beam milling can comprise two angled beams, either sequentially or simultaneously, the first beam performing primarily a cutting operation and some clean up work while the second beam primarily conducts clean up work of the redeposition of the debris caused by the cutting. In another embodiment, a single angled ion beam can be employed, provided its angle is within a particular range.

In U.S. Pat. No. 5,438,747, the pole trim structure was performed after magnetic yoke formation (P2-defined method). This requires that the effect of the topography of the coil and insulation structure be overcome in both the photoresist process and the ion milling process.

An alternative approach described in U.S. Pat. No. 5,452,164 describes a method of forming a pole trimmed structure right after the P1 process step (P1-define approach) where the structure of the device is substantially planar and therefore a superior patterning process for a narrow track can be obtained. In this method, a photoresist pattern was used as a hard mask, and ion milling was needed to remove both the top pole tip and the pedestal structure at the bottom shield.

A full pole trimmed structure is desired for better off track capability and superior nonlinear transition shift (NLTS) performance when writing onto a magnetic recording medium for high density recording. The critical issue for pole trimming in the MR structure of the prior art is intrusion into the S2/P1 layer by the ion milling process. In both methods described in U.S. Pat. Nos. 5,438,747 and 5,452,164, the S2/P1 layer suffered from damage due to the ion mill trimming process which causes write-induced instability during MR reading.

SUMMARY OF THE INVENTION

An object of this invention is to provide an MR head structure with vertically aligned pole tips after yoke formation (P2-defined) and a uniformly thick bottom shield layer to thereby reduce side writing for high track density.

Another object of this invention is to provide a method of fabricating an MR head structure with vertically aligned pole tips after yoke formation (P2-defined) and a uniformly thick bottom shield layer to thereby reduce side writing for high track density.

A further object of this invention is to provide an MR head structure with vertically aligned pole tips after the P1 pole process and before the formation of the coil and insulation layer (P1-defined) and a uniformly thick bottom shield layer to thereby reduce side writing for high track density.

A further object of this invention is to provide a process for protecting a bottom shield layer from intrusion from an ion milling process used to form vertically aligned pole tips.

This invention teaches a method of manufacturing a thin film merged magnetic head including an inductive write transducer and a magnetoresistive (MR) sensor wherein an MR read element consisting of either AMR, SV or a GMR sensor is sandwiched between a first shield layer S1 and a second shield layer S2/P1, wherein P1 serves as the bottom pole of the inductive transducer. In keeping with the invention, a protection layer is deposited on the shield layer S2/P1 in a pattern that forms a window. A pole tip region is formed over the window. Ion beam milling is used to trim the pole tip region resulting in the formation of channels in the second shield layer S2 adjacent to the pole tip region. The thin film magnetic head structure is supported by a nonmagnetic substrate.

The invention has the advantage that the trimmed region is limited to a localized area near the write pole and has minimum damage on S2/P1 so that the MR read sensor is properly shielded and the inductive writing process has the least effect on read performance.

The invention has the further advantage that the structure reduces side writing with a consequent improvement in off-track performance and inductive write performance to achieve high density magnetic recording.

DETAILED DESCRIPTION OF THE INVENTION

Figure 1:
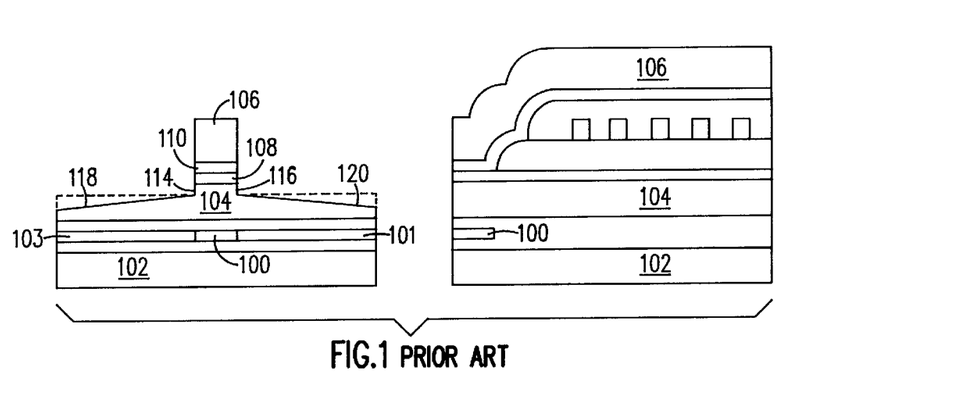
FIG. 1 contains both air bearing surface (ABS) and cross sectional views of a prior art MR head structure.

In FIG. 1, a read head formed on a substrate includes an MR element 100 sandwiched between a first shield (S1)

layer 102 and second shield (S2) layer 104. The MR read element consists of a sensing element, a domain stabilization layer and a bias layer where the sensing element is made of either AMR, SV or GMR material. The domain stabilization layer is used to suppress Barkhausen noise. The bias layer ensures that the sensor element works in the linear region and has the highest sensitivity. The second shield (S2) layer 104 of the read head also serves as the bottom pole P1 of a write head. The inductive write head includes the bottom pole P1 and a top P2 pole 106. An insulating transducing write gap layer 108 is sandwiched between the P1 and P2 layers. The large width of the second shield S2 layer 104 beyond the sides 114, 116 of the pole tip region causes flux to extend toward the second shield layer S2 beyond the width of the pole tip element P1. This flux causes side writing which degrades off-track performance. In practice this problem is overcome by ion milling the second shield layer on either side of the write gap to create a pedestal which is an extension of the bottom pole piece P1. The width of the second shield layer S2 is chosen to shield the MR element.

In practice, during ion milling to create the pedestal, the second shield layer S2 becomes sloped when forming the pole trim structures. Due to shadowing of the pole P2, S2/P1 becomes sloped and is thin at the outside regions 118, 120, away from the write pole. This is undesirable as the thin structure reduces the effect of shielding at the outside regions. Ideally, the structure would be flat as indicated by the broken lines in FIG. 1.

Method of Manufacturing A Magnetoresistive (MR) Head Structure

The preferred method of the present invention is to fabricate a P2 defined write structure. In a P2 defined type of write structure, the write pole structure is formed after the coil layer, insulation and P2. The alternative embodiment of this invention is for a P1 defined write structure. In a P1 defined type of write structure the write pole structure is formed before the coil layer, insulation and P2.

A high Bsat layer at the bottom P2 tip and at the top of pedestal structure is provided near the write gap. High Bsat is a high moment soft magnetic metal which can be made of $Ni_{100-x}Fe_x$, (X=35, 45, and 55), CoZrX (X=Ta, Cr, Ru, Rh) and FeNX (X=Al, Ta, Rh).

Figure 2A:
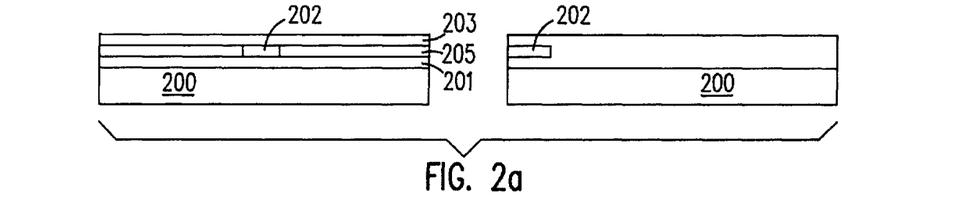
FIGS. 2a–g illustrate a first embodiment of the present invention describing both air bearing surface (ABS) and crosssectional views of intermediate structures produced during manufacture of a merged MR head. In this embodiment, a trimmed pole structure is generated at a final top pole process step after the formation of the coil and insulation layer (P2-defined method)
Figure 2B:
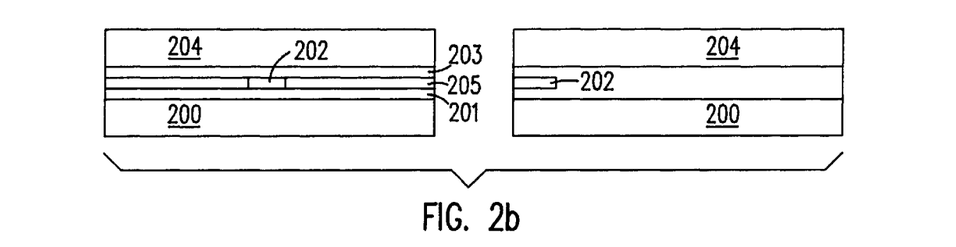
Figure 2C:
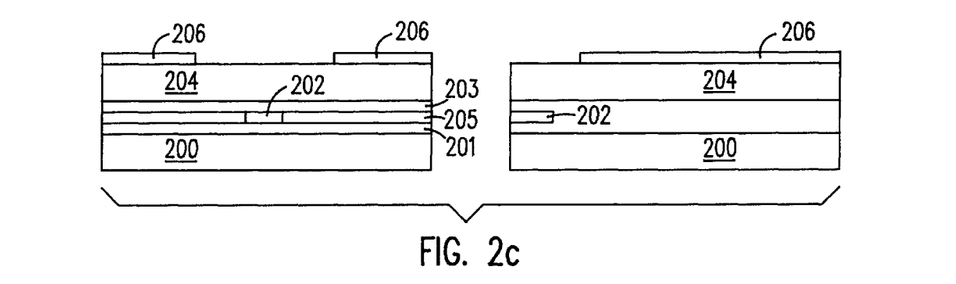
Figure 2D:
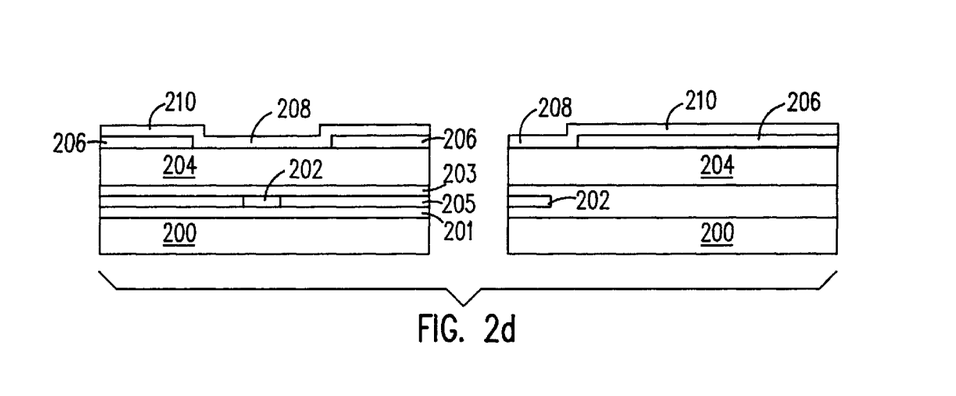
Figure 2E:
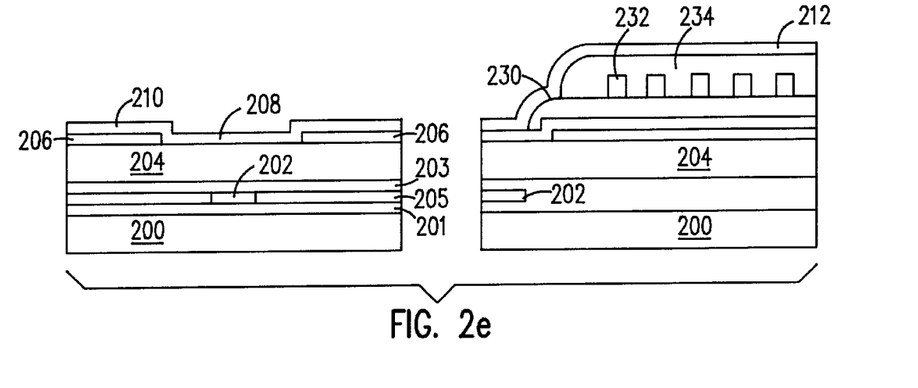
Figure 2F:
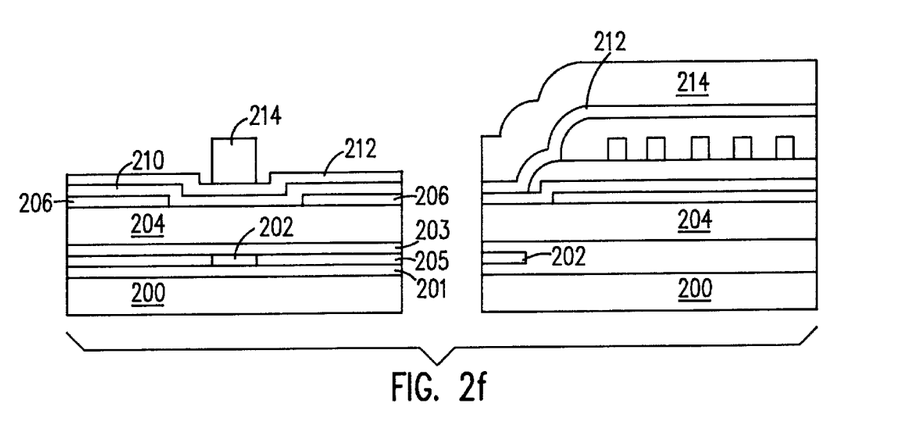
Figure 2G:
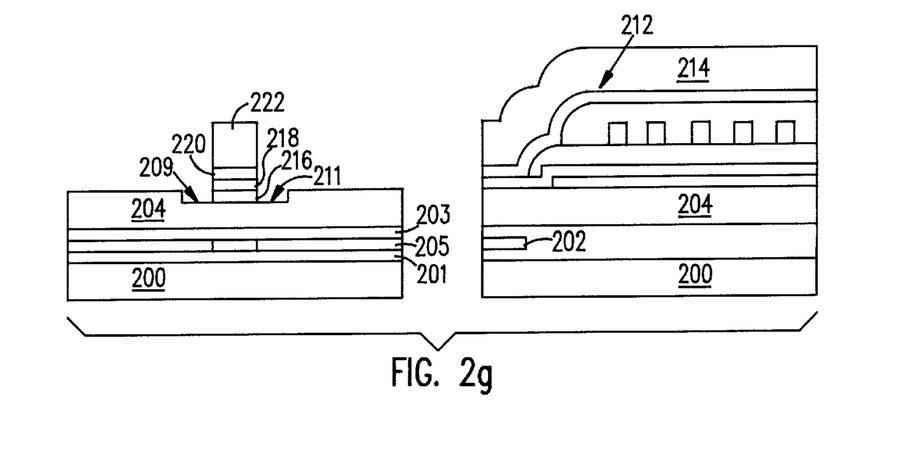
Figure 3:
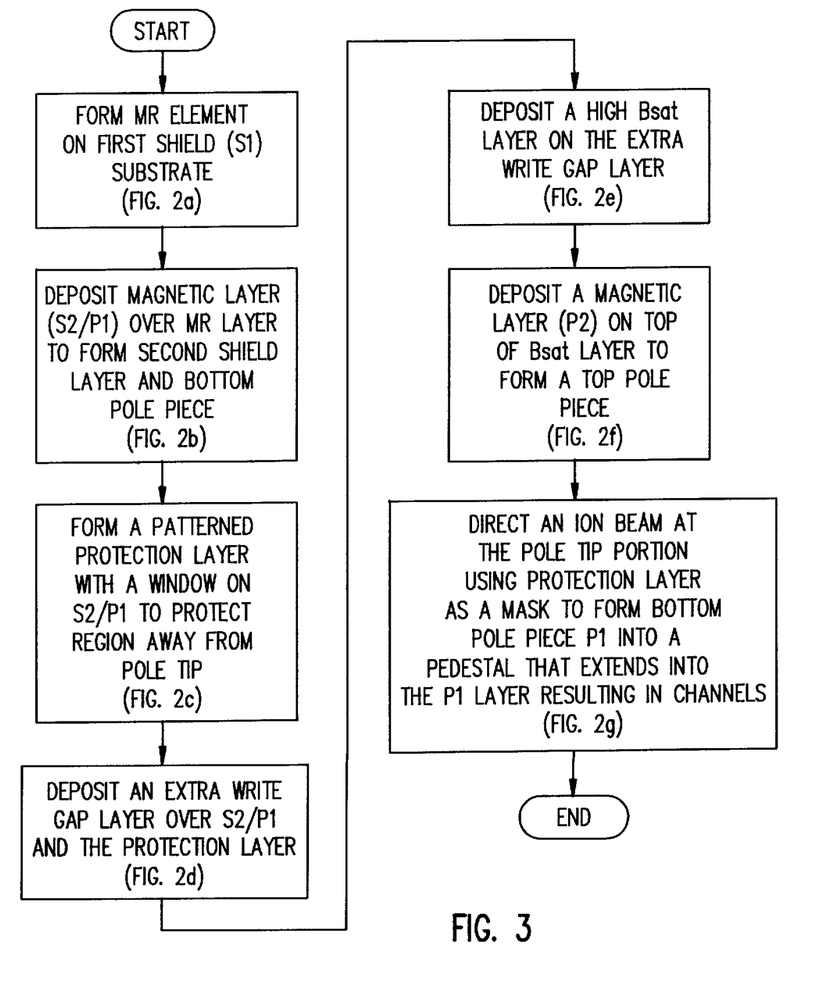
FIG. 3 is a detailed flow diagram of a method of manufacturing the protection window used in the embodiment shown in FIGS. 2a–g.

FIGS. 2a–g provide a detailed description of a first embodiment with a P2-defined method. A first shield S1 layer 200 is provided upon which a sensing element 202 and a pair of lead connects 205 are deposited (FIG. 2a). The MR read element consists of a sensing element, a domain stabilization layer and a bias layer where the sensing element can be made of either one of AMR, SV and GMR materials. A second shield S2 layer 204 is deposited on the MR element (FIG. 2b). The MR element is therefore diposed between the first shield S1 layer 200 and the second shield S2 layer 204 and is separated from both shields by a first read gap 201 and a second read gap 203. The second shield layer 204 will also serve as the bottom pole piece P1 of a write head, and is designated as S2/P1. The second shield material can be made of either Permalloy, or a bilayer structure of Permalloy and high Bsat soft magnetic material. A protection layer 206 is deposited on the S2/P1 shield layer 204 (FIG. 2c). The preferred protection layer is made of a composite layer of dielectric material such as $Al_2O_3SiO_2$ or $Si_3N_4$, and nonmagnetic materials such Ta, W and Mo. The composite layer is then patterned to form a window 208. A write gap layer 210 is deposited on the protection layer (FIG. 2d). Following the write gap process, the first insulation layer 230, coil 232 and the second insulation layer 234 are fabricated (FIG. 2e). Optionally, a multiple layer coil structure can be fabricated. After the formation of the coil and insulation structure, a high Bsat layer 212 is deposited on the write gap layer 210 and insulation 230 and 234. A top P2 pole 214 consisting of either plated or sputtered magnetic films is then deposited on the Bsat layer (FIG. 2f). Ion beam milling is employed to trim the pole tip in order to achieve vertical side walls (FIG. 2g). In the case of sputtered high Bsat materials used for both pole tip and yoke structure, a photoresist or other hard mask can be used for the ion milling mask. The protection layer 206 functions during ion milling to create a pedestal 216 which is an extension P1/P2 of the bottom pole P1.

Figure 4A:
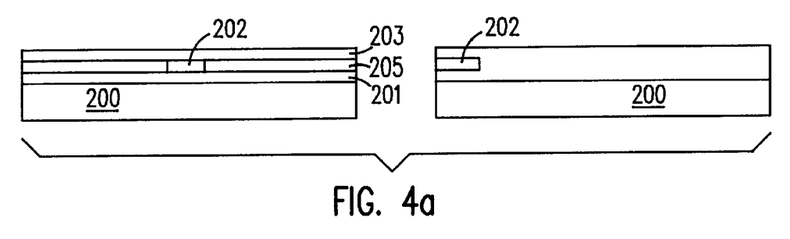
FIGS. 4a–4j illustrate a second embodiment of the present invention describing both air bearing surface (ABS) and cross-sectional views of intermediate structures produced during manufacture of a merged MR head. In this embodiment, a trimmed pole structure was generated right after the bottom pole P1 process and prior to the formation of the coil and insulation layer (P1-defined approach).
Figure 4B:
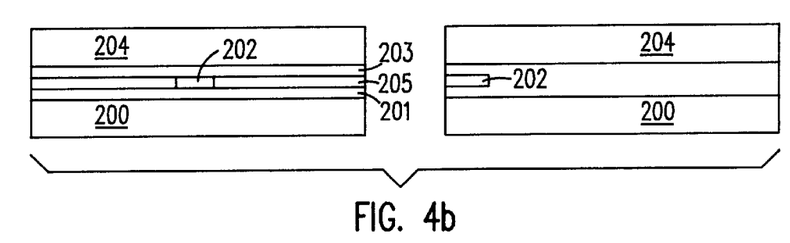
Figure 4C:
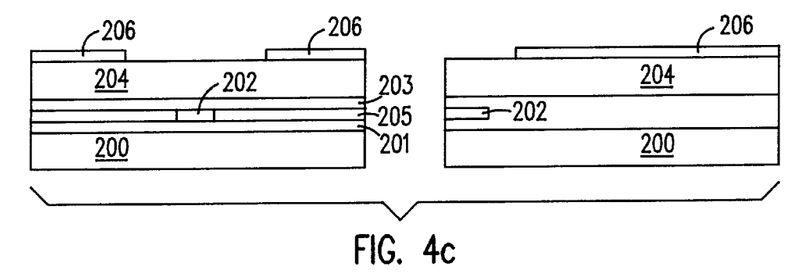
Figure 4D:
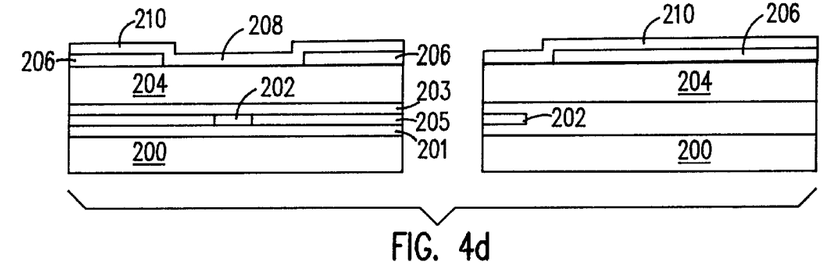
Figure 4E:
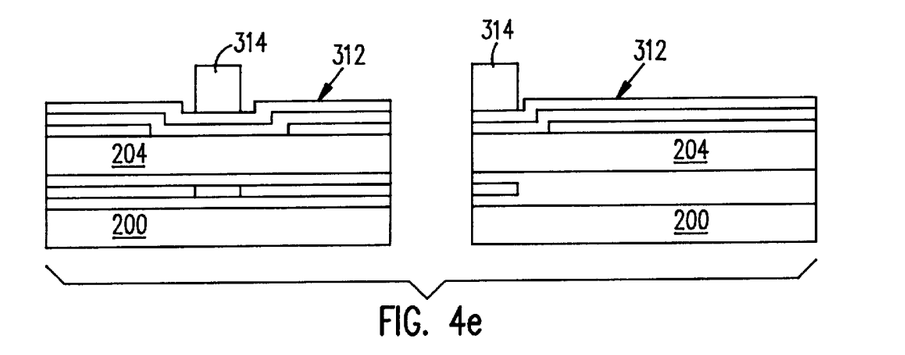
Figure 4F:
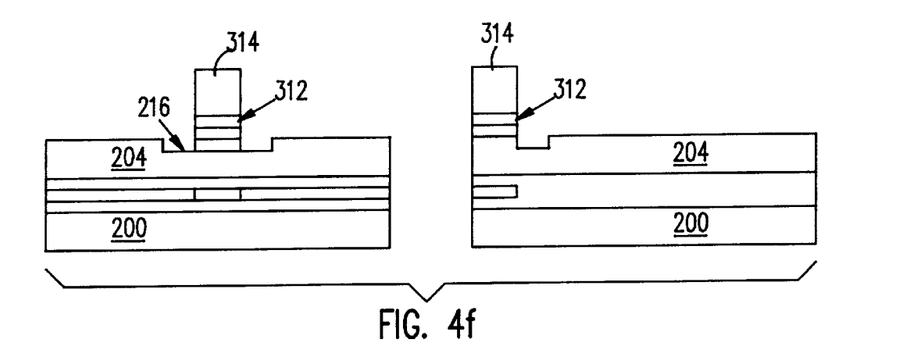
Figure 4G:
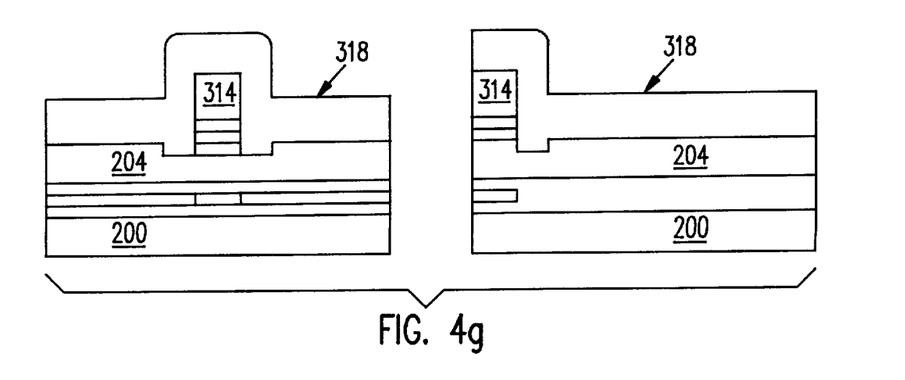
Figure 4H:
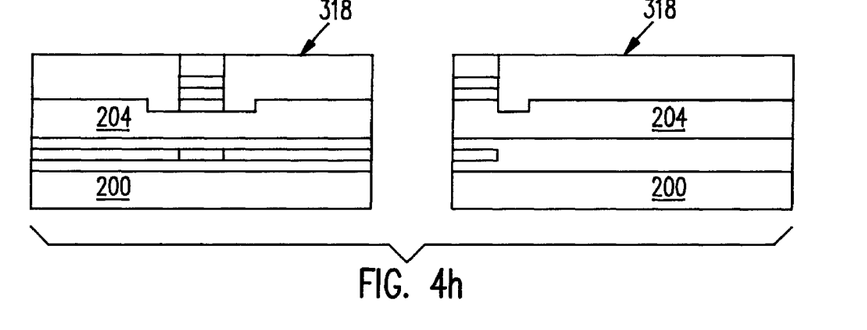
Figure 4I:
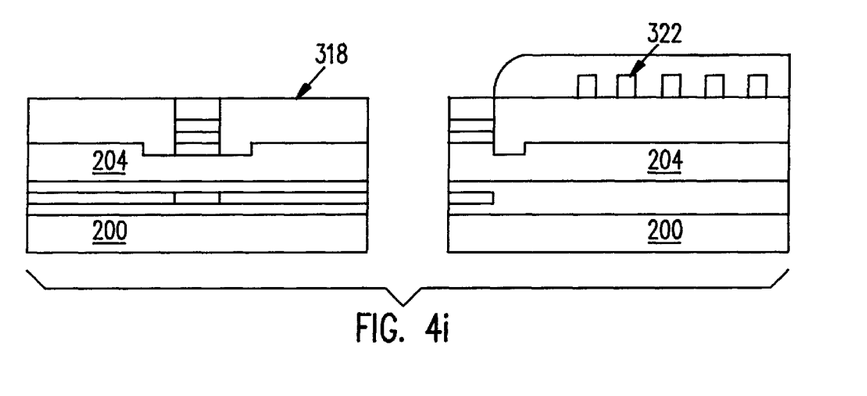

Another embodiment can be extended to a P1-defined structure. The method is described in detail in FIGS. 4a–4j. Similar process steps as the first embodiment of FIG. 2 are used for this embodiment up to write gap formation (FIG. 4a–4d). Following the write gap formation process, a high Bsat layer 312 is deposited on the write gap 210 and a top pole tip structure 314 is formed (FIG. 4e). A combination of Ion beam milling and reactive ion milling is employed to trim the pole tip in order to achieve vertical side walls (FIG. 4f). In the case of sputtered high Bsat materials used for both pole tip and yoke structure, a photoresist or other hard mask can be used for ion milling mask. The protection layer 206 functions during ion milling to create a pedestal 216 which is an extension P1/P2 of the bottom pole piece P1. After trimmed pole formation, a dielectric insulation layer such as $Al_2O_3$, $SiO_2$ and $Si_3N_4$ is deposited (FIG. 4g) and subsequently the structure is planarized by chemical mechanical polishing (FIG. 4h). The planarized dielectric materials will function as the first insulation for coil 322 (FIG. 4i). Optionally, a multiple layer coil structure can be fabricated using additional coil and insulation. After the formation of the coil and insulation structure, the top yoke structure 324 is fabricated (FIG. 4j).

Figure 4J:
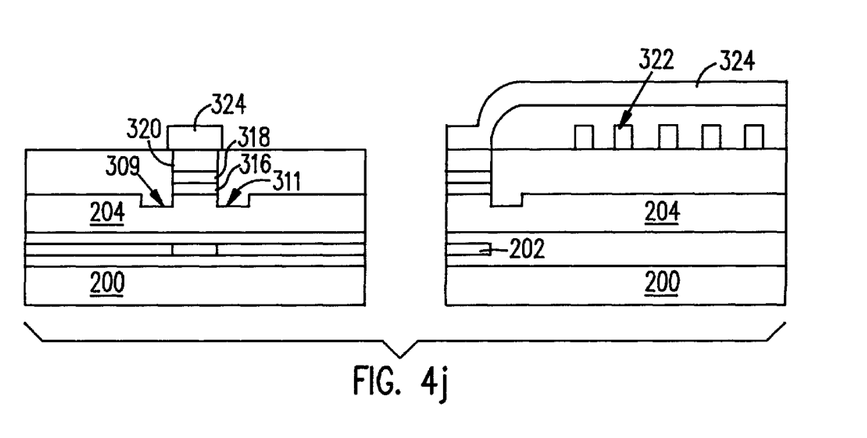
Figure 5:
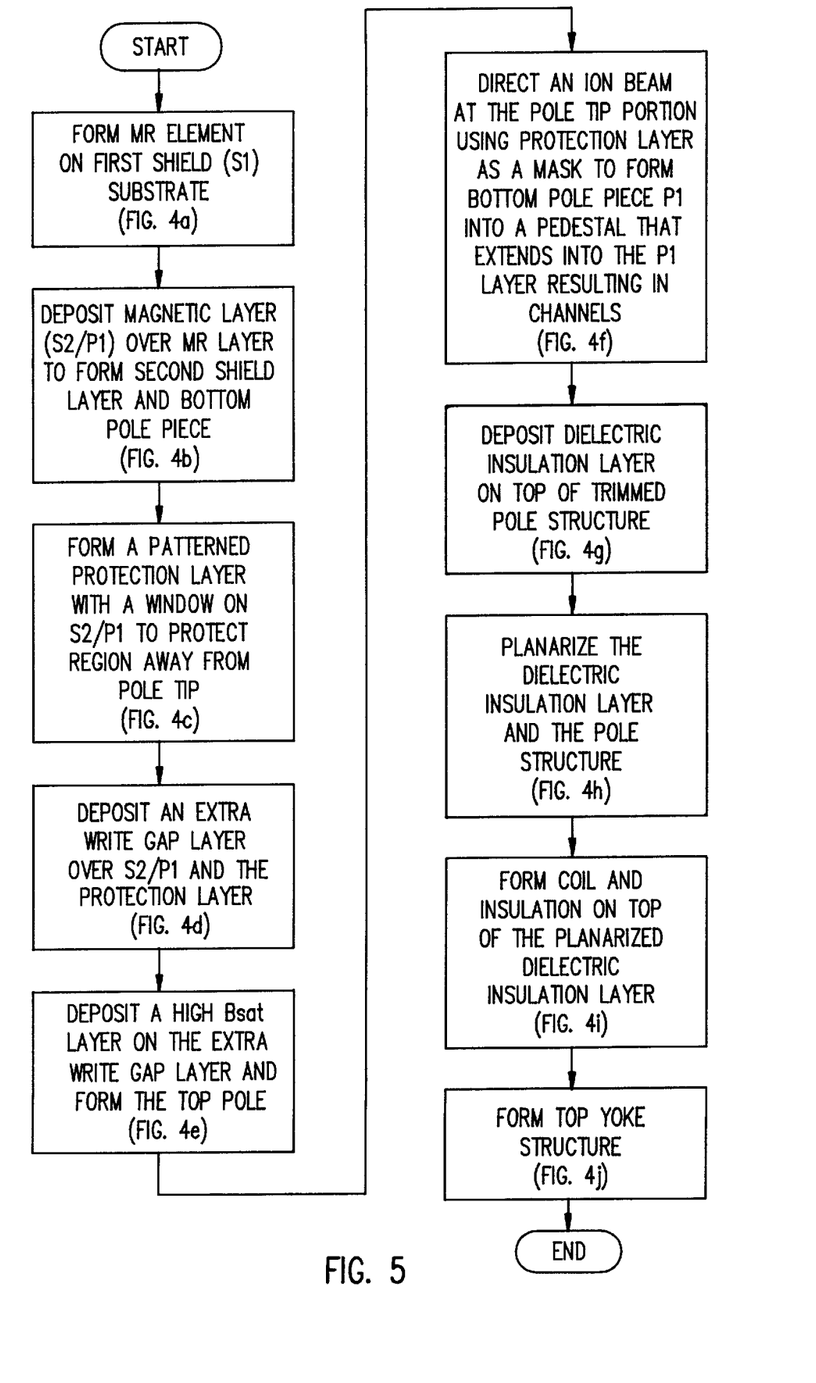
FIG. 5 is a detailed flow diagram of a method of manufacture the protection window used in the embodiment shown in FIGS. 4a–4j.

As shown in FIGS. 2g and 4j, the use of a protection layer results in the formation of channels 209/211 and 309/311, in the second shield S2 layer 204 adjacent to the pole tip region. The channels prevent flux from extending toward the second shield S@ layer 204 beyond the width of the pole tip element P1/P2. This structure reduces side writing with a consequent improvement in off-track performance. The width of the second shield S2 layer 204 is such that the MR element is shielded.

Method Of Forming A Window

For either a P1 defined type of write structure or a P2 defined type of write structure a protection layer and window is formed in accordance with the teachings of the present invention. A first embodiment is described with reference to FIG. 6.

Figure 6A:
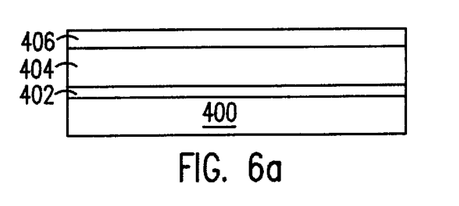
FIGS. 6a–d illustrate a method of forming a protection window mask.
Figure 6B:
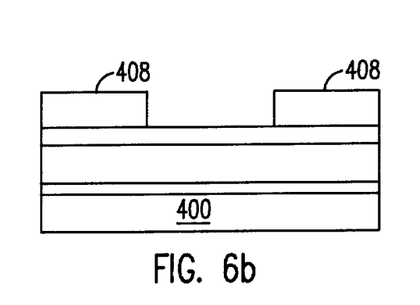
Figure 6C:
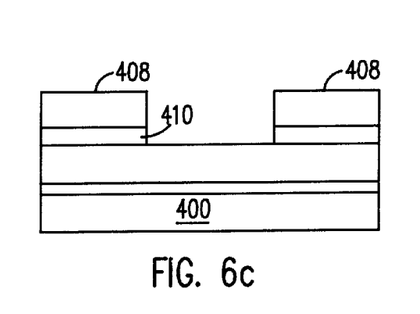
Figure 6D:
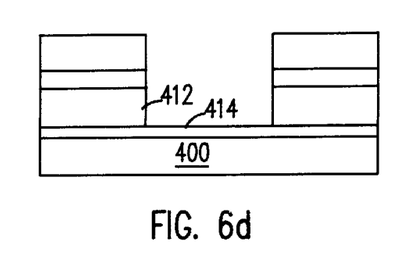

A trilayer structure formed with a thin Ta (100–300 Å) layer 402, an $Al_2O_3$ layer (5000–15000 Å) 404 and a thick Ta film (2000–10000 Å) 406 is formed on top of S2/P1 400 (FIG. 6a). A protection window mask 408 is formed by a photoresist process (FIG. 6b). Ion milling is then used to remove the top thick Ta film 410 (FIG. 6c). When $Al_2O_3$ is exposed, a wet etch process or reactive process can be applied to remove the $Al_2O_3$ material 412 with bottom thin Ta film 414 as etch stop (FIG. 6d). The thin Ta etch stop layer can be removed by sputter etch during depositing the write gap.

The top thick Ta film is chosen because of its high ion milling selectivity with respect to transition metal and alloys used for pole materials. Other types of materials such as TaW, W can also be used. The further advantage of using Ta materials is its high selectivity to write gap $Al_2O_3$ in an Ar/fluorine reactive ion milling process.

Other types of an insulating dielectric material such as Al$_2$O$_3$, SiO$_2$ or Si$_3$N$_4$ can be used for forming a window. This window can be patterned by either a liftoff technique or an etch back technique.

Pole Formation Process

After a protection layer is formed, the P2 pole structure is formed. The preferred method to form the pole structure is illustrated in FIG. 7.

Figure 7A:
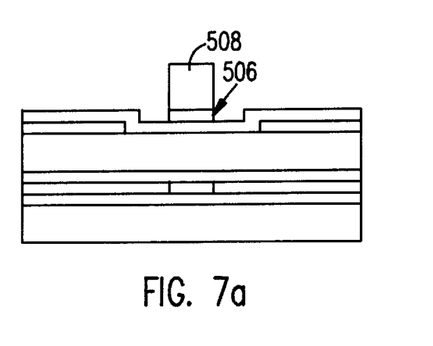
FIGS. 7a–7c illustrate a method of a pole trim process using a combined ion milling and reactive ion milling process.

(1) Ion mill (physical bombardment) to remove either high Bsat layer or seed layer 506 completely. A hard mask 508 may be used made of either photoresist or pole materials.

Figure 7B:
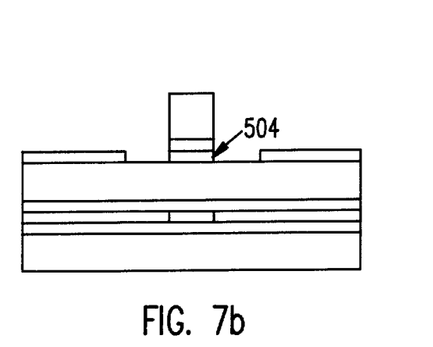

(2) A reactive ion beam etch (RIBE) with Ar/fluorine chemistry is applied to remove write gap 504. The preferred chemistry is Ar/CHF3.

Figure 7C:
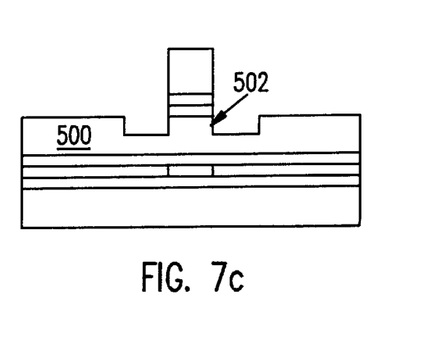

(3) After removing the write gap, ion mill is used to form pedestal structure 502 in S2/P1 layer 500.

Magnetoresistive (MR) Head Structure

The final structure of the first embodiment using a P2 defined method shown in FIG. 2g is comprised of a first shield layer 200, an MR read element 202, a second shield layer 204 that also functions as a bottom pole P1, a P1/P2 region 216, an extra write gap 218, a write gap 220, and a top pole 222. The use of a protection layer and window results in the formation of channels 209, 211, in the second shield layer (S2) 204 near the sides of the pole tip region 222.

The final structure of the embodiment using a P1 defined method shown in FIG. 4j is comprised of a first shield layer 200, an MR read element 202, a second shield layer 204 that also functions as a bottom pole P1, a P1/P2 region 316, an extra write gap 318, a write gap 320, and a P2 pole tip piece 324. A coil 322 surrounded by insulation is disposed between the lower P1 pole and top P2 pole layers. A top P2 cap 324, which is wider than the P2 pole tip, is connected to a yoke. The use of a protection layer and window results in the formation of channels 309, 311, in the second shield layer (S2) 204 near the sides of the pole tip region.

The channels of both structures prevent flux from extending toward the second shield layer S2 beyond the width of the pole tip element P1/P2. This structure reduces side writing with a consequent improvement in off-track performance. The width of the second shield layer S2 is such that the MR element is shielded.

It will be understood by those skilled in the art that the MR element described herein can be any element operated using an an isotropic MR (AMR) effect, spin-valve (SV) effect, or giant magnetoresistive (GMR) effect, or any other structures that are based on the phenomenon that the resistance of magnetic conductors change when a magnetic field is applied to change the magnetization of the element.

It will be understood by those skilled in the art that the ion beam process may be a combination of Ar ion beam milling process and Ar/CHF$_3$ reactive ion beam milling process, and that other fluorine chemistry such as CF$_4$ and CH$_2$F$_2$ can also be applied.

It will also be understood by those skilled in the art that the protection layer may be any suitable nonmagnetic material, such as, but not limited to Ta, Al$_2$O$_3$, Ta film, a combination of thin Ta (100–300 Å), Al$_2$O$_3$ (5000–15000 Å) and thick Ta film (2000–10000 Å), or other non-magnetic material such as SiO$_2$, Si$_3$N$_4$, TaW, and Cr.

The top thick Ta film is chosen because of its high ion milling selectivity with respect to transition metal and alloys used for pole materials. Other types of materials such as TaW, W can also be used. The further advantage of using Ta materials is its high selectivity to write gap Al$_2$O$_3$ in Ar/fluorine reactive ion milling process. Other types of an insulating dielectric material such as Al$_2$O$_3$, SiO$_2$ or Si$_3$N$_4$ can be used for forming a window. This window can be patterned by either a liftoff technique or an etch back technique.

What is claimed is:

1. A merged thin film magnetic head including an inductive write structure and a magnetoresistive sensor comprising:

a nonmagnetic substrate;

a first shield layer disposed above said substrate;

a second shield/pole layer that serves as a first magnetic pole of said inductive write structure;

a protection layer over said second shield/pole layer in a pattern that exposes a window for forming a pedestal to support said inductive write structure;

a second magnetic pole layer over said second shield/pole layer and over said window; and a pedestal formed below said inductive write structure, and recessed channels formed in said second shield/pole layer for defining said pedestal.

2. The merged magnetoresistive head of claim 1 wherein said magnetoresistive element is either an anisotropic magnetosresistive element, a spin-valve element or a giant magnetoresistive element.

3. The merged magnetoresistive head of claim 1 wherein said protection layer is nonmagnetic.

4. The merged magnetoresistive head of claim 1 wherein said protection layer consists essentially of thin Ta (100–300 Å), Al$_2$O$_3$ (5000–15000 Å) and thick Ta film (2000–10000 Å).

5. The merged magnetoresistive head of claim 1 wherein said protection layer consists essentially of nonmagnetic material such as SiO$_2$, Si$_3$N$_4$, TaW, and Cr.

6. A thin film merged magnetic head including an inductive write structure having top and bottom poles, and a magnetoresistive sensor, comprising:

a nonmagnetic substrate;

a first shield layer disposed on said substrate;

a second shield layer that functions as a bottom pole of said inductive write structure;

a magnetoresistive read element disposed between said first and second shield layers;

a pole tip region associated with said top and bottom poles;

a write gap;

an extra write gap over said write gap;

a protection layer in the form of a window defining channels formed in said second shield layer.

* * * * *